United States Patent [19] [11] 3,801,135
Winter [45] Apr. 2, 1974

[54] TRAILER HITCH FOR PASSENGER MOTOR VEHICLE

[76] Inventor: Charles M. Winter, 2580 W. Philadelphia St., York, Pa. 17404

[22] Filed: Aug. 20, 1973

[21] Appl. No.: 389,668

Related U.S. Application Data

[62] Division of Ser. No. 283,822, Aug. 25, 1972.

[52] U.S. Cl............................ 280/423 R, 296/23 MC
[51] Int. Cl.............................................. B62d 53/00
[58] Field of Search .......... 280/415, 423, 512, 476, 280/494, 81 R; 296/23 MC; 267/58

[56] References Cited
UNITED STATES PATENTS

| | | | |
|---|---|---|---|
| 3,393,922 | 7/1968 | Adams | 280/423 R |
| 3,390,896 | 7/1968 | Philapy | 280/423 R |
| 2,647,761 | 8/1953 | Kentz | 280/423 R UX |
| 2,622,891 | 12/1952 | Knapp | 280/476 R |
| 2,212,081 | 8/1940 | Spires | 280/494 |

*Primary Examiner*—Leo Friaglia
*Assistant Examiner*—Randall A. Schrecengost
*Attorney, Agent, or Firm*—C. Hercus Just

[57] ABSTRACT

Trailer hitch mechanism mounted within the trunk area of a passenger type motor vehicle and connected directly to the chassis frame members of the vehicle to support and provide means to connect a large capacity fifth-wheel type trailer to the hitch mechanism and provide mobile living quarters for a greater number of people than can be accommodated in the cab of a pick-up truck. Auxiliary supporting wheel means of a variety of types and embodiments are connectable directly to the chassis frame members of a passenger vehicle to augment the supporting capacity of the conventional rear wheels of the vehicle and thereby enable such vehicle, as distinguished from a pick-up truck, to support the relatively heavy weight of the forward end of said fifth-wheel type trailer without undue strain on the passenger vehicle, and thus provide the more comodious travel facilities of such passenger vehicle to accommodate a full contingent of occupants for which the vehicle normally is designed. Quick detachment of the trailer and auxiliary supporting wheel means from the vehicle readily restores the vehicle to the normal appearance of the vehicle with a minimum of effort.

9 Claims, 13 Drawing Figures

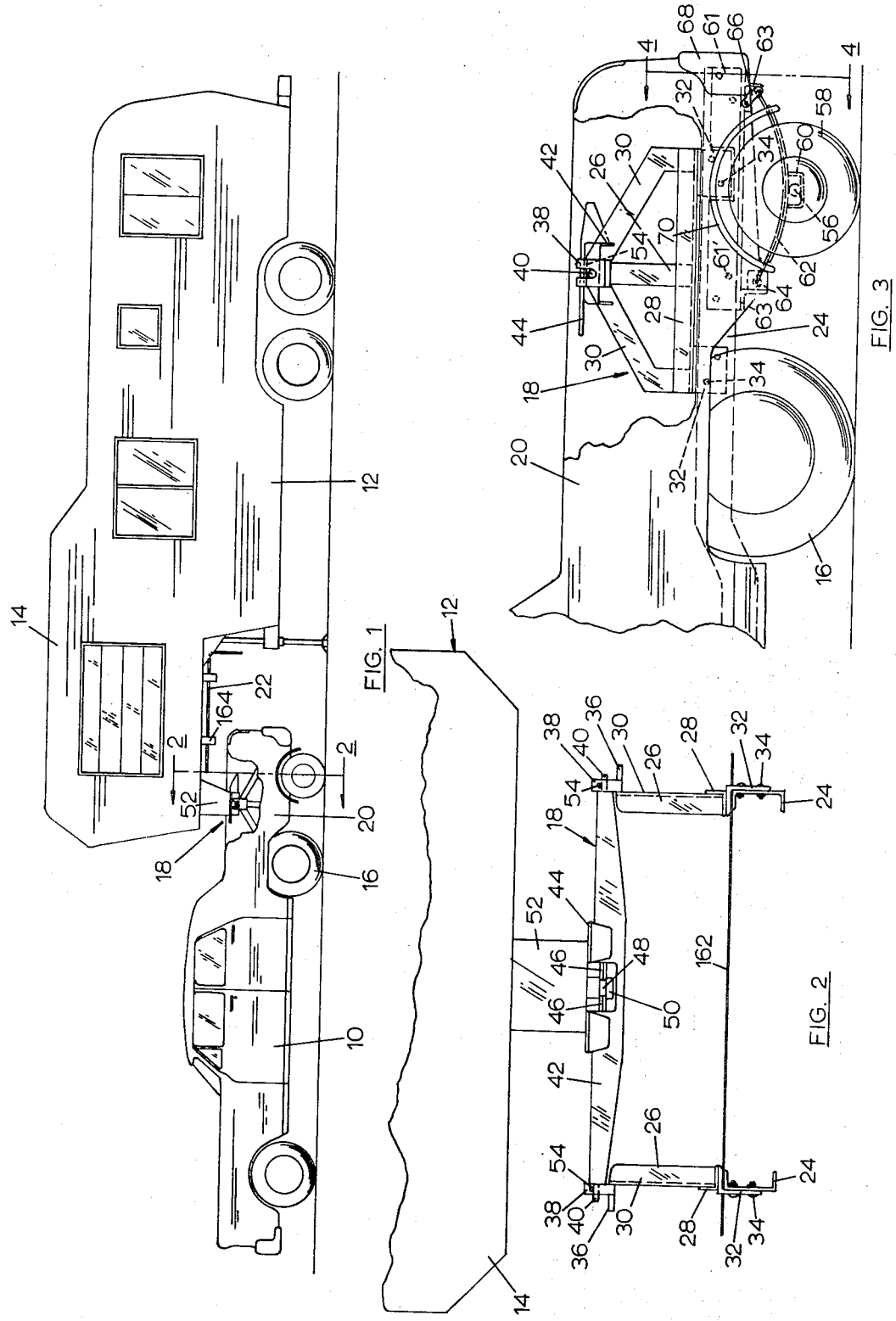

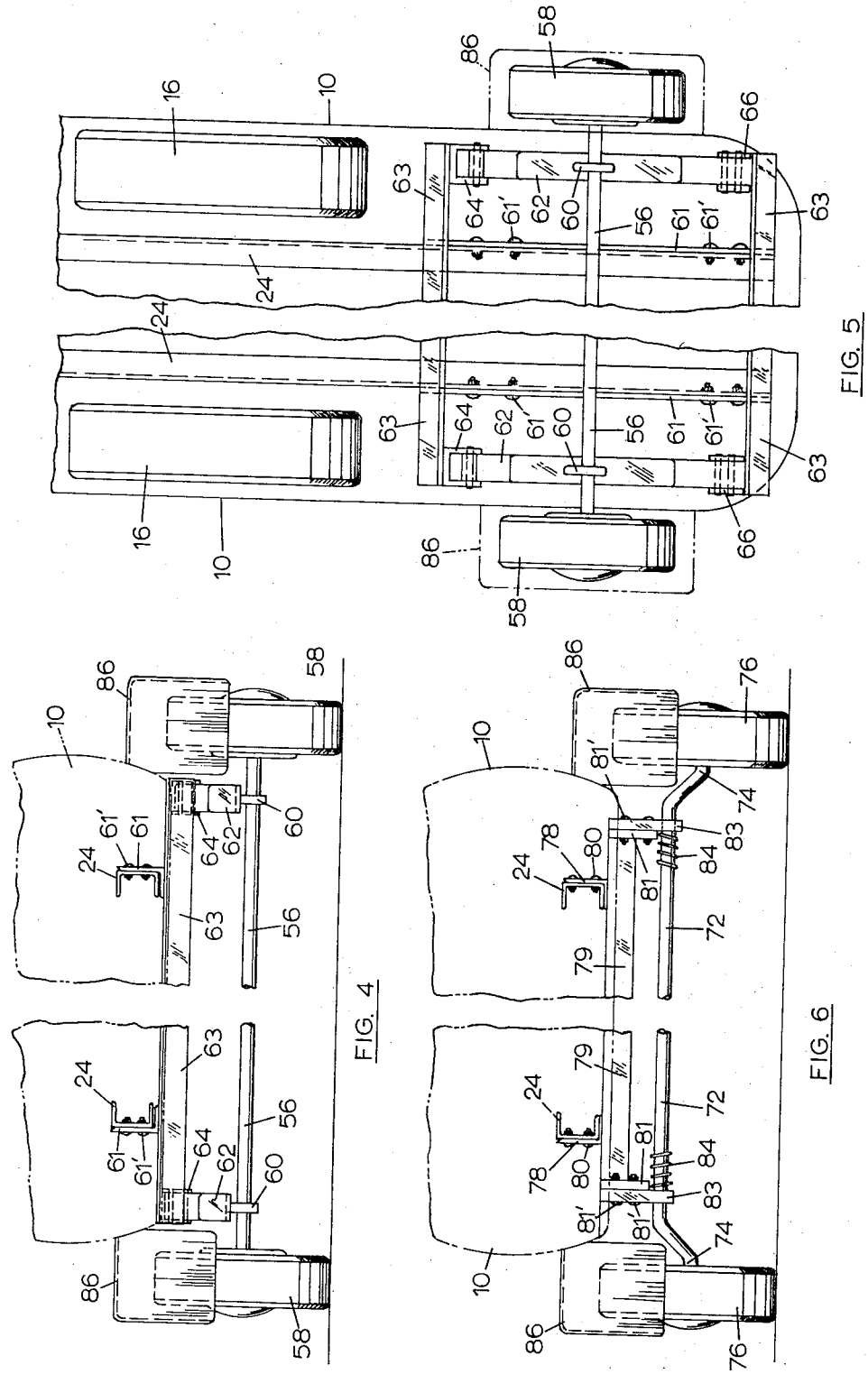

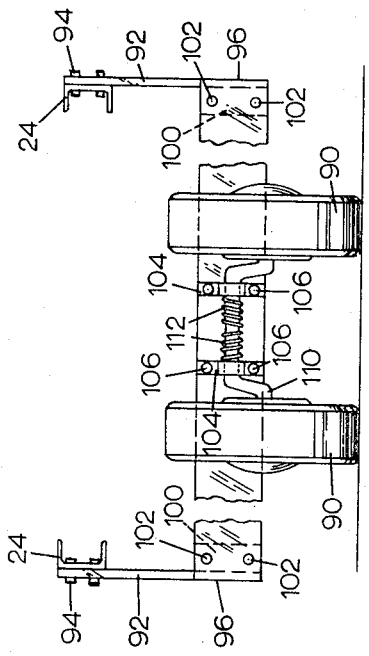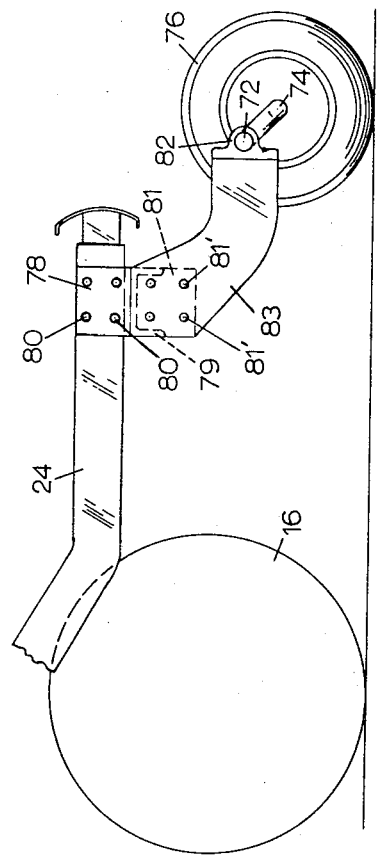

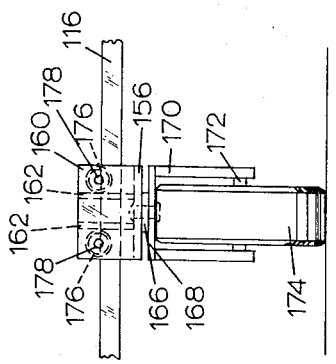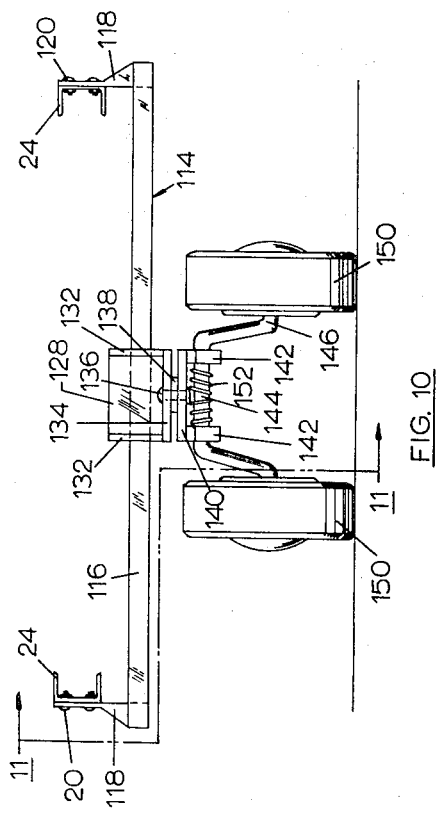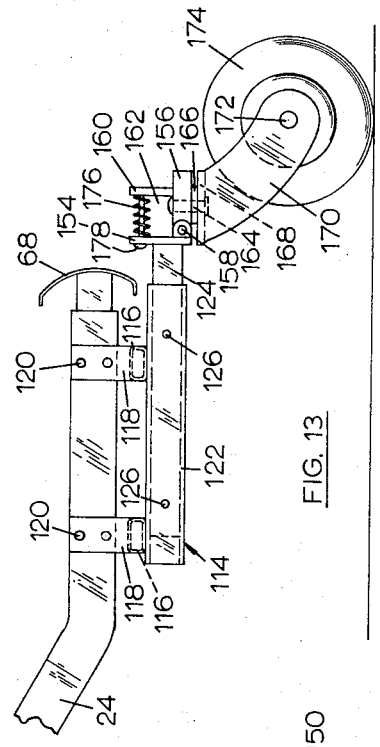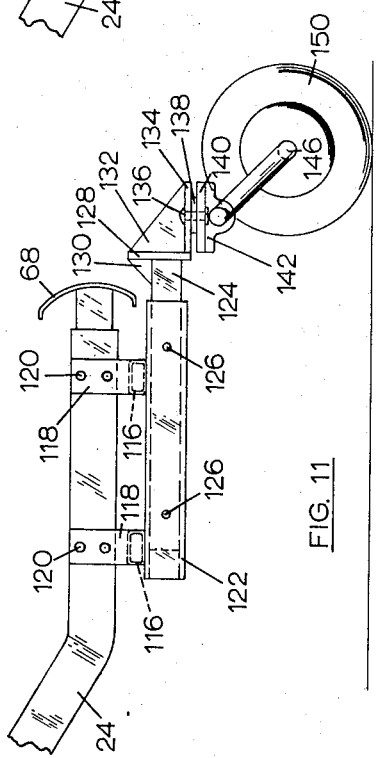

TRAILER HITCH FOR PASSENGER MOTOR VEHICLE

This application is a division of Ser. No. 283,822, filed Aug. 25, 1972.

BACKGROUND OF THE INVENTION

For many years, it has been popular to undertake touring in passenger type motor vehicles, including various types of sedans, and provide living accommodations by towing various types of trailers which are connected to the rear end of the vehicle by different types of trailer hitchs, most of which included a ball and socket type of connecting means between a bracket connectable, for example, to the rear bumper of the vehicle and to tongue mechanism projecting from the forward end of the trailer. Many of the popular types of trailers are supported upon either one or a pair of axles upon which attempts have been made to more or less balance the weight of the trailer but, in general, at least a certain amount of the weight of the forward end of the trailer was imparted to the trailer hitch on the vehicle. To facilitate the accommodation of such additional weight being imposed upon the rear end of the vehicle, it is not uncommon to employ heavier springs between the vehicle and the rear axle thereof.

As the popularity for using touring type trailers increased, there has been a corresponding increase in the desire for more comodious type trailers in which either more extensive accommodations for a great number of people has been included or more comfortable and spacious living quarters have been included to add to the pleasure of such touring. This however, has resulted in increased weight and size in such trailers. To accommodate such increased weight and provide adequate power to tow the same, in recent years, it has become quite popular to use pick-up trucks, such as ½ ton or greater capacity, to tow the trailers. However, pick-up trucks normally have only a single seat type cab in which, usually at most only three people can be accommodated. Thus, in using pick-up trucks for such purposes, it is obvious that the number of tourists in each vehicle is extremely limited, not withstanding the fact that the larger sizes of trailers can accommodate a greater number of people for living purposes than are capable of being transported in the cab of the vehicle.

With the advent of the use of pick-up trucks to tow particularly the larger sizes of trailers used in touring, certain types of so called fifth-wheel trailers have been developed and offered to the public. These trailers are provided at the forward end with a fifth wheel pivot pin which is adapted to be latched to a fifth wheel hitch plate supported by suitable frame mechanism attached to the bed of the pick-up truck. Under such circumstances however, although the heavier and more comodious types of trailers utilize such fifth-wheel hitch means for connecting it to a pick-up truck, the very restricted accommodation for a limited number of passengers in the cab of the pick-up truck correspondingly limited the number of persons who could utilize such more comodious type of trailer. The weight and size of such larger trailers which utilize fifth-wheel hitch means normally have prevented their use in conjunction with conventional passenger type motor vehicles, such as two door or four door sedans in which a greater number of tourists comfortably can be accommodated than in the single seat arrangement of the cab of a pick-up truck. Thus, even though fifth-wheel type trailers can comfortably accommodate a greater number of tourists than can be accommodated in the cab of a pick-up truck, it has not been possible heretofore to effectively utilize a passenger type motor vehicle, such as of the sedan type, to support the forward end of a fifth-wheel type trailer and tow the same during touring or other similar operations upon highways, at least for any substantial distance and at normal cruising speed, primarily because of such added weight being imposed upon the rear wheels of passenger type vehicles and a tendency for the heavier type of trailers to whiplash, especially at higher cruising speed.

A further disadvantage of being required to employ a pick-up truck of a selected weight capacity to support and tow a fifth-wheel trailer is that the average touring family does not own a pick-up truck but most such families have at least one five or six passenger auto, such as a sedan. A passenger type sedan, because of its inability to effectively and safely support and tow such fifth-wheel type trailer, cannot be used for such purpose and thus the added expense of either purchasing or renting a pick-up truck is necessary when using a normal type of fifth-wheel type trailer of the popular types now offered the touring public.

SUMMARY OF THE INVENTION

It is the principle purpose of the present invention to provide a trailer hitch mechanism which may be mounted within the truck area of a conventional passenger type motor vehicle, such as a sedan, and render the same capable of having the forward end of a relatively heavy fifth-wheel type trailer connected thereto for support of the forward end thereby, the additional weight imposed upon the conventional rear wheels of said vehicle being supported by a supplemental axle which is substantially directly connected to the chassis frame of the vehicle and having at least one and preferably a pair of supplemental wheels pivotally connected to said axle.

Another object of the invention is to provide said hitch mechanism with frame means of which the dimensions are such that they preferably may be completely contained within the trunk compartment at the rear end of such conventional passenger type motor vehicle and concealed within said trunk compartment when the rear deck cover of the vehicle is in closed position and the trailer is disconnected from the vehicle.

A still further object of the invention is to provide means by which said afore-mentioned frame means may be directly connected to the chassis frame of the vehicle and supporting means, which includes a fifth-wheel plate, are connected to and supported swivelly by said frame means to render the connection of the trailer to the vehicle more flexible, while permitting quick separation of the supporting means from the frame means when it is desired to disconnect the trailer from the passenger vehicle as, for example, when the trailer is to be parked and the vehicle is to be used solely for transportation of the tourists.

Still another object of the invention is to provide various mechanisms by which a variety of embodiments of supplemental axles, and the mechanism by which they are connected directly to the chassis frame of the tourist type motor vehicle of the type referred to above includes means to permit swivel movement of the auxiliary wheels about a vertical axis supported relative to said chassis frame.

Still other objects of the invention are to provide a number of different embodiments of spring means by which the supplemental axle and the wheel means supported thereby are resiliently connected either directly or indirectly to the chassis frame of the vehicle so as to be capable of readily absorbing shocks imposed upon said supplemental axle and wheel means incident to the same traversing roadways and the like, thus providing such supplemental axle and wheel means with independent spring supporting mechanism and thus not further burdening the springs by which the conventional rear axle and wheels of the passenger type vehicle are connected to the chassis frame of the vehicle.

Details of the foregoing objects and of the invention, as well as other objects thereof, set forth in the following specification and illustrated in the accompanying drawings comprising a part thereof.

BRIEF DESCRIPTION OF THE DRAWINGS

FIG. 1 is a side elevation of an exemplary passenger type motor vehicle provided with hitch mechanism and embodying the principles of the present invention and to which the forward end of a fifth-wheel type trailer is connected in operative relationship.

FIG. 2 is a fragmentary vertical sectional view as seen generally on the line 2—2 of FIG. 1 and utilizing a substantially larger scale than employed in FIG. 1.

FIG. 3 is a fragmentary side elevation, partly broken away, showing the rearward end portion of the passenger vehicle illustrated in FIG. 1 on a substantially larger scale than on said figure and showing in greater detail certain aspects of the hitch structure than are possible to be seen in FIG. 1.

FIG. 4 is a transversely foreshortened exemplary and fragmentary rear elevation of the vehicle shown in FIG. 3 as seen on the line 4—4 thereon to illustrate one embodiment of spring support means for the supplemental axle and wheels thereon.

FIG. 5 is a fragmentary plan view of a supplemental axle arrangement connected to the chassis frame of a vehicle by means similar to those shown in FIGS. 3 and 4 but in which the supplemental axle is long enough to support the auxiliary supporting wheels laterally outward beyond the conventional wheels of the vehicle.

FIG. 6 is a rear elevation of another embodiment of supplemental axle and wheel means for the passenger type vehicle from that illustrated in FIGS. 3–5.

FIG. 7 is a fragmentary side elevation of the further embodiment of axle and wheel means illustrated in FIG. 6.

FIG. 8 is a fragmentary and partially sectioned rear elevation of still another embodiment of supporting means for a supplemental axle and wheels to be connected to the rear end of the chassis frame of a passenger type motor vehicle.

FIG. 9 is a fragmentary side elevation of the embodiment of supplemental wheel structure shown in FIG. 8.

FIG. 10 is a fragmentary rear elevation of still another embodiment of supplemental axle and supporting wheel arrangement which is connected to the vehicle chassis by means of a hitch frame fastened to the rear portion of the chassis frame, said embodiment being provided with a swivel.

FIG. 11 is a fragmentary side elevation of the embodiment of the invention shown in FIG. 10.

FIG. 12 is a fragmentary rear elevation of an embodiment similar to FIG. 10 but in which only a single auxiliary wheel is employed.

FIG. 13 is a fragmentary side elevation of the embodiment shown in FIG. 12 and in which the hitch frame which supports the wheel is illustrated.

The features of the invention covered by this divisional application are principly illustrated in FIGS. 1–3 relative to supporting means in the truck compartment of the passenger type vehicle and the auxiliary wheel support means to be associated therewith according to this application are those illustrated primarily in FIGS. 10–13, which show swivel connections for the auxiliary wheel mounts. However, for a full description of the invention, the following description from parent application, Ser. No. 283,822 is retained as preliminary to the detailed description of the divisional subject matter and especially to provide details of the supporting mechanism within the trunk compartment which are associated with the particular auxiliary wheel structures comprising the specific subject matter of this application.

DETAILED DESCRIPTION

In FIG. 1 of the drawings, there is illustrated a conventional passenger type motor vehicle 10 which is exemplary of the type of motor vehicle to which the trailer hitch mechanism of the present invention is adapted to be applied. As shown in said figure, the motor vehicle 10 is a four door sedan but, for example, the invention is equally applicable to a two door sedan or any other type of passenger motor vehicle, except a station wagon, capable of accommodating a greater number of people than the cab of a conventional pick-up truck for example. Connected to the rear end of the motor vehicle 10 is an exemplary fifth-wheel type trailer 12 which is illustrated as being of the type adapted to accommodate, for example, four or more people. That number is greater than can be accommodated in the cab of a conventional pick-up truck. Because of the ability of the trailer 10 to accommodate at least four adult individuals, the size of the same is such that it normally cannot be supported and towed by the normal hitch and coupling mechanisms employed to connect the average, smaller sizes of trailers to a conventional passenger type motor vehicle.

By way of comparison, normal sizes of trailer of the type conventially and frequently coupled to the rear end of a motor vehicle for towing thereby, when coupled thereto by conventional coupling means, other than a fifth-wheel type of coupling, will have an overall length substantially equal to that illustrated in FIG. 1 in the exemplary manner. However, such conventional trailer will not include the forward portion of the trailer 12, for example, which overlies the trunk portion of the vehicle 10 as illustrated in FIG. 1, in view of the fact that such conventional coupling means comprises a tongue which extends forwardly from the front end of the trailer and is connected to a hitch or coupling extending rearwardly past the rear bumper of the vehicle and including a ball and socket connecting means to permit ready pivoting of the trailer relative to the rear end of the vehicle. Accordingly, it can be seen from this that there is substantial advantage to using a fifth-wheel type of trailer in view of the fact that the forward compartment portion 14 thereof comprises an additional bedroom capable of accommodating at least two people without increasing the overall length of motor vehicle and trailer over the length of a conventional motor vehicle and conventional trailer of the type normally coupled to a motor vehicle and usually only including a single bedroom and that is usually of the type transformed into sleeping conditions from a table and bench seat normally at one end of the trailer.

Adding such forward compartment portion 14 to the trailer 12 however so increases the weight thereof that the normal or conventional rear wheels 16 and the springs which connect the same to the chassis of the vehicle 10 are inadequate to effectively support such weight for any substantial distance. Accordingly, heretofore, it has been conventionally necessary to utilize a pick-up truck of suitable weight rating to accommodate appropriate hitch mechanism which is mounted directly upon the floor of the rear bed of such truck for purposes of supporting a fifth-wheel plate to which a fifth-wheel pin on the forward end of the fifth-wheel type of trailer is pivotally connected. Such pick-up trucks are provided with suitable spring strength and rear wheel capacity to effectively support the forward end portion of a so called fifth-wheel type trailer. The disadvantage of such arrangement is, however, that only a very limited number of passengers can be accommodated in the single seat of the cab of such pick-up truck, usually at most three adults, and even when three ride in such seat, crowding conditions usually prevail. Accordingly, even though such fifth-wheel type of trailer is capable of accommodating four or more adult persons, the cab of the pick-up truck cannot accommodate them and transportation laws in a number of states forbid passengers to ride in a trailer being towed by a tractor vehicle.

As indicated above, therefore, the principle purpose of the present invention is to provide improved hitch mechanism adapted to attach a fifth-wheel type trailer to the truck area of a conventional passenger type motor vehicle and especially a sedan which has front and rear seats therein in order that the greater capacity of a fifth-wheel type trailer may be utilized to the fullest while accommodating that number of passengers comfortably within the seating arrangment of a conventional passenger type motor vehicle and thereby provide maximum touring comfort to the occupants of the vehicle while traveling and permit them to enjoy the more comodious accommodations of the trailer when utilizing the same when the vehicle and trailer are parked. In addition, when the trailer 12 is disconnected from the improved hitch mechanism 18, which is accommodated within the trunk compartment 20 of the passenger vehicle 10, the rear deck cover 22, which is shown detached from the trunk compartment 20 in FIG. 1, may be used to completely conceal the hitch mechanism 18 after the cover 22 has been restored to pivotal arrangement relative to the trunk compartment 20, in accordance with the principles of the present invention.

In accordance with the preferred principles of the present invention, the hitch arrangement 18 is of a type which can be sold in kit form and connected relatively quickly and securely to the chassis frame, such as the opposing channels 24, which comprise the most essential elements of the chassis frame, the same being shown in exemplary manner in FIGS. 2 and 3. The hitch mechanism 18 comprises frame means 26 which include, for example, vertical structural angle members which project upwardly from a pair of horizontal angle members 28 which are exposed at opposite sides of the trunk compartment 20 of the vehicle 10. Angular brace members 30 also are employed to secure the vertical frame means 26 against forward and rearward tilting and the opposite ends of the same are also connected suitably to the horizontal angle members 28 as can be readily visualized from FIG. 3.

For purposes of securing the hitch mechanism 18 to the channels 24 of the chassis frame, appropriate angular brackets or cleats are connected to the lower faces of the horizontal angle members 28 and flanges thereof extend perpendicularly downward along the outer surfaces of the channels 24 and are connected thereto by appropriate bolts 34. The upper flanges of the brackets 32 may be firmly secured to the horizontal lower flanges of the angle members 28 by welding, riveting or otherwise. When the brackets 32 have been connected to the channels 24 of the chassis frame in the manner described above, the frame means 26 are effectively secured against lateral movement relative to opposite sides of the vehicle.

The upper ends of the frame means 24 have short horizontal members 36 integrally connected thereto and respectively projecting outwardly in opposite directions for purposes of having U-shaped seat members 38 connected thereto which respectively pivotally receive trunnions 40 which are connected to and extend from the opposite ends of a horizontal support member 42 upon which the U-shaped fifth-wheel plate 44 is integrally connected intermediately of the ends of the member 42. The plate 42 is of conventional type and includes latch members 46, see FIG. 2, which engage the angular, reduced portion 48 of fifth-wheel pin 50 which is secured to the lower end of supporting block 52, which is secured to and projects downwardly from the lower surface of the forward compartment portion 14 of the trailer 12. Removeable pins 54 preferably extend through the opposite legs of the seat members 38 and overlie the trunnions 40 to prevent upper movement thereof from the seats of members 38. From the foregoing description, it will be seen that the forward end of the trailer 12 is connected to the rear trunk portion of the passenger type motor vehicle 10 for pivotable movement about the vertical axis of the fifth-wheel pin 50 and upward separative movement of the forward end of the trailer from the hitch mechanism 18 is prevented by the operation of latch members 46 relative to pin 50.

It is readily apparent from FIG. 3 in particular that when the forward end of trailer 12 is removed from the wheel plate 44, for example, the upper end of the hitch mechanism 18, which includes the fifth-wheel plate 44, is no higher than the upper confines of the trunk compartment 20 of vehicle 10, whereby when the rear deck cover 22 is pivotally connected in normal manner to the rear trunk compartment 20, the hitch mechanism 18 may be completely concealed therein. Further, if desired, separation of the forward end of trailer 12 from the trunk compartment 20 of vehicle 10 may be undertaken by leaving the fifth-wheel plate 44 connected to the fifth-wheel pin 50, whereby when the pins 54 are removed from the seat members 38, the horizontal support member 42 also must be removed from the frame means 26 and remain connected to the forward end of the trailer 12, thereby providing the trunk compartment with greater capcity for accommodating other items, including luggage, although there is ample space within the trunk compartment even when the support member 42 remains connected to the seat members 38.

Another important and essential feature of the present invention comprises the provision of a supplemental axle and auxiliary supporting wheels unit having pneumatic tires thereon, and means to connect said axle either directly or indirectly to the chassis frame of the vehicle, preferably by quickly attachable and detachable means, to supplement the supporting capabilities of the conventional rear wheels 16 of the vehicle and the springs by which they are supported. By such means, the supporting capabilities of the conventional rear wheels and springs of the vehicle, which are inadequate to support the forward end of the fifth-wheel trailer, are supplemented sufficiently to enable the rearward portion of the vehicle 10 to very capably support such weight of the forward portion 14 of the trailer 12 for long periods while traveling at high speeds. The present invention provides a number of different embodiments of supplemental axle and auxiliary supporting wheel units which are shown in FIGS. 3–12. The auxiliary wheel embodiments of FIGS. 3–9 comprise the subject matter claimed in the parent application Ser. No. 283,822, while the embodiments of FIGS. 10–13 are part of the subject matter of the instant divisional application.

The embodiment of said supplemental axle and auxiliary supporting wheel unit illustrated in FIGS. 3 and 4 comprises a horizontal supplemental axle 56 having auxiliary supporting wheels 58 mounted on bearings at opposite ends of the axle. Suitable connecting means 60 extend around the axle 56 and also around the intermediate portions of leaf spring assemblies 62. Elongated connecting brackets, such as structural angles 61, are connected to the chassis channels by bolts 61' for quick attachment and detachment. Transverse members 63 extend across the chassis and are connected fixedly to the opposite ends of brackets 61. The forward ends of the spring assemblies 62 are pivotally connected to brackets 64 which are directly connected to and extend downwardly from the channels 24 of the chassis frame. The opposite ends of the spring assemblies 62 are connected by conventional spring shackles 66 to suitable brackets on the rearward ends of connecting brackets 61, as best shown in FIG. 3, adjacent to the rear bumper 68.

It will be seen from FIG. 3 that the diameter of the auxiliary supporting wheels 58 is less than that of the conventional rear wheels 16 of the vehicle 10. Under circumstances where the length of the supplemental axle 56 is such that the auxiliary supporting wheels 58 are spaced apart substantially the same distance as the conventional wheels 16, said auxiliary supporting wheels will track behind the conventional wheels 16 when the vehicle 10 is moving. Depending upon the nature of the rear fenders of vehicle 10, appropriate openings may have to be made in the rear lower portions of the conventional rear fenders at opposite sides of the trunk compartment 20 to accommodate the upper portions of the auxiliary supporting wheels 58. However, as shown in FIGS. 4 and 5, a slightly modified embodiment is illustrated in which the supplemental axle 56 is longer than that referred to above, as a result of which the auxiliary supporting wheels 58, which are mounted on opposite ends of axles 56, extend laterally outward beyond the conventional rear wheels 16 of the vehicle, which are illustrated in diagrammatic manner in FIG. 5 in order to simplify the view. Under such circumstances, if desired, simple, supplementary arcuate fenders 86, such as shown somewhat diagrammatically in FIGS. 4 and 5, may be secured by appropriate means to the outer surfaces of the conventional rear fenders at the opposite sides of the trunk compartment 20 by quickly attachable self-tapping screws, or otherwise, in accordance with the principles of the present invention.

In FIGS. 6 and 7, a still further embodiment of supplemental axle and auxiliary supporting wheel arrangement is illustrated in which it will be seen that the supplemental axle 72 is provided with opposite end portions 74 which are laterally offset from the axis of the central portion 72 of said axle. The laterally offset end portions rotatably support the auxiliary supporting wheels 76 which, like the auxiliary wheels 58 of the preceding embodiments, preferably are smaller in diameter than the conventional rear wheels 16 of vehicle 10. Attaching brackets 78 are angle members and have one flange of each connected to the rear end portions of the channels 24 of the chassis frame, by appropriate bolts 80 to support transverse member 79, such as a structural channel member. Plates 81 are securely welded to the ends of support member 79 and to which the upper ends of axle brackets 83 are fixedly connected by rivets or bolts 81'. The rear portions of the axle brackets 83 have suitable bearings 82 connected thereto which receive the supplemental axle 72 adjacent the offset outer end portions thereof. Spring suspension means of a number of kinds are provided for the auxiliary supporting wheels 76. Representative of such suspension means are torsion springs 84 which are shown extending around portions of the supplemental axle 72 adjacent the bearings 82. One end of each of said springs, for example, is non-rotatably connected to the axle 72, and the opposite end is non-rotatably fixed relative to the chassis frame, such as by being connected to a portion of the bearings 82 or the axle brackets 78. A desired amount of tension is produced in the springs 84 when they are installed. It also is to be understood that other types of springs may be used, such as compressible coil springs, air springs, leaf springs, or otherwise, including appropriate connecting and supporting means, in all embodiments.

The spring arrangements referred to above are highly suitable to permit the auxiliary supporting wheels 76 to withstand shock imposed upon the same incident to traveling along a highway, or the like. Also, the position of the offset portions 74 of the axle 72 may be such that the wheels 76 will track in line with the conventional rear wheels 16 disposed forwardly therefrom or, if desired, the offset end portions 74 of axle 72 may be disposed sufficiently apart that the auxiliary supporting wheels 76 will be positioned laterally outward beyond the conventional rear wheels 16 of the vehicle. Under such latter circumstances, the auxiliary supported wheels 76 may have supplemental, arcuate fenders 86 positioned in spaced relationship with respect to the upper portions of said wheels. The supplemental fenders 86 may be appropriately secured to the outer fenders 88 of the trunk compartment 20 as illustrated in limited manner in FIG. 6.

Still another embodiment of arrangement of supplemental axle and auxiliary supporting wheels thereon is illustrated in FIGS. 8 and 9. In this arrangement, the auxiliary supporting wheels 90 are transversely spaced apart but a shorter distance than in the various preceding embodiments, as is evident from FIG. 8. To support the wheels 90, as will be seen on FIG. 9, a pair of offset type axle brackets 92 respectively are secured at one end, by bolts 94, to the rear end portions of the channels 24 of the chassis frame. The outer ends 96 of said brackets extend below the bumper 68, for example, and project rearwardly therefrom to support a horizontal member 98 which, for convenience, may be in the form of a metal plate. The opposite ends of the plate 98 may, for example, be firmly secured to the outer ends 96 of the axle brackets 92 by providing inwardly extending flanges 100 on the outer ends 96 to receive connecting bolts 102.

Connected to and projecting rearwardly from the horizontal member 98 are a pair of bearing brackets 104 which are secured to the member 98 by appropriate bolts 106. The bearing brackets 104 support supplemental axle 108, the outer end portions 110 of which are offset laterally from the axis of the central portion of the axle 108 for purposes of receiving appropriate bearings upon which the auxiliary supporting wheels 90 are mounted. As in certain of the preceding embodiments, the diameter of the wheels 90 is less than that of the conventional rear wheels 16 of passenger vehicle 10. Also, as will be seen from FIG. 9, the lateral extensions on the supplemental axle 108 extend downward and rearward from the axis of the central portion of axle 108.

The auxiliary supporting wheels 90 and the supplemental axle 108 which supports the same are tensioned to project in a downward direction by means of suitable springs such as coiled torsion springs 112 which are clearly shown in FIG. 8. One end of each spring, for example, may be anchored fixedly to the bearing brackets 104, while the opposite ends thereof are firmly secured to the supplemental axle 108. It will be understood that the direction of convolutions of the springs are such as to urge the wheels 90 downwardly and thereby enable the same to augment the cushioning effect of the springs which support the conventional rear wheels 16 incident to shock being imposed upon the wheels 16 and 90 incident to traveling along a highway or the like.

In FIGS. 10 and 11 one of several embodiments of supplemental axle and auxiliary supporting wheel arrangement is illustrated which involves swivel means in accordance with the specific subject matter of this divisional application. Also, for purposes of providing a different type of means to connect the auxiliary supporting wheels of the embodiment of FIGS. 10 and 11 to the chassis frame, an additional or supplemental connecting means 114 is provided which comprises a hitch frame. Said hitch frame extends slightly below the rearward portion of the channels 24 of the chassis frame. Referring to FIG. 10, the hitch frame 114 comprises transverse members 116 which extend between the opposite channels 24. A pair of the members 116 preferably are employed, in parallel relationship to each other, as shown in FIG. 11. If desired, and especially for strength coupled with reasonably light weight, the transverse members may comprise rectangular structural tubes of suitable gauge. Connected to the opposite ends of the members 116 are downwardly extending bracket members 118 which, if desired, may be formed from sililar structural elements as the members 116. The upper ends of the bracket members 118 may be flatened to facilitate the connection thereof to the channels 24 by bolts 120. The hitch frame 114 also includes rearwardly extending means in the form of a frame member 122 which is best shown in FIG. 11. Said member, in the preferred embodiment, is a tubular structural member which is rectangular in cross section, the widest dimension preferrably being horizontal. The member 122 is suitably connected to the transverse members 116 of the hitch frame, preferably intermediately of the ends thereof, by any suitable means such as welding, or otherwise. The rear end of the member 122 preferably extends rearwardly from the rear-most member 116 and, if desired, may extend beyond the rear bumper 68.

Suitably supported within the rearwardly extending member 122 is an adjustable rearward member 124 which, in cross section, is complementary to the interior cross section of the member 122. Member 124 is secured in longitudinally adjusted position with respect to member 122 by inserting one or more transverse pins or bolts 126 through aligned holes formed respectively in the sides of the members 122 and 124. One of said members, for example, may be provided with a plurality of said holes spaced longitudinally along the members to permit desired longitudinal adjustability between the two members.

The outer-most end of member 124 supports a transversely extending bracket plate 128 which is rigidly fastened to the member 124. If desired, the plate 128 may be braced by a suitable small angle plate 130. The opposite ends of plate 128 have a pair of similar angular brace members 132 extending rearwardly therefrom and rigidly connected thereto. The lower edges of the brace members 132 are connected to the opposite ends of a horizontal member 134 which is centrally bored to receive a swivel pin 136. Immediately below member 134, a suitable bearing 138 is mounted upon the swivel pin and the lower end of the pin is connected to a lower horizontal plate 140 which, for example, may be similar in size, if desired, to horizontal member 134.

The plate 140 supports at opposite ends thereof a pair of bearing blocks 142 between which extends a supplemental axle 144, the opposite ends 146 of which preferably are offset transversely even distances and project axially in opposite directions to support auxiliary supporting wheels which, as will be seen from FIG. 10, are relatively close together.

As in regard to some of the preceding embodiments, the auxiliary supporting wheels 150 are spring-biased downwardly, or clockwise as viewed in FIG. 11 by means of suitable springs such as spiraled torsion springs 152. One end of said springs, for example, may be anchored to the plate 140 or the bearing blocks 142, while the opposite ends thereof are suitably anchored securely to the supplemental axle 144. In view of the details of the structure set forth above, it will be seen that the arrangement shown in FIGS. 10 and 11 comprises a swiveled arrangement of auxiliary supporting wheels which offers substantial support to augment the support provided by conventional rear wheels 16 of the vehicle 10 to sustain the weight of the forward end of the fifth-wheel trailer 14. It will be understood that the direction of the coils of the springs 152 is such as to urge the wheels 150 downwardly as described above. The swivel pin 136 readily enables the wheel unit of said embodiment, which is connected to the hitch frame 114 by the swivel pin 136, to very capably and appropriately track behind the rear end of the passenger vehicle 10 incident to cooperating with the conventional rear wheels 116 in supporting said trailer 14.

Referring to FIGS. 12 and 13, another embodiment of auxiliary supporting wheels to augment the supporting effect of the conventional rear wheels 16 of the vehicle is illustrated. This embodiment in many respects is similar to that shown in FIGS. 10 and 11, particularly in regard to the hitch frame 114, details of which are the same as those shown in FIGS. 10 and 11, whereby the various elements of said frame are provided with the same reference numerials and no additional detailed description thereof is repeated with respect to the embodiment of FIG. 12 and 13, being understood that the foregoing description may be referred to with respect to said details. The mechanism secured to the rear end of adjustable rearward member 124 is different in the embodiment of FIGS. 12 and 13 over that shown in FIGS. 10 and 11 however, said details being as follows.

Secured to the terminal end of adjustable rearward member 124 is a vertical plate 154. A horizontal pivot plate 156 is connected by an appropriate hinge clevis 158 to the lower edge of plate 154. Extending vertically upward from pivot plate 156 is a compression plate 160 which is rigidly connected thereto and is suitably braced by a pair of exemplary angled bracing plates 162 shown in FIGS. 12 and 13.

The horizontal pivot plate 156 is centrally bored to receive a swivel pin 164 which extends through aligned holes in pivot plate 156, anti-friction thrust bearing 166, and the connecting member 168 of yoke 170. Extending between the outer ends of the opposite legs of the yoke 170 is a supplemental axle 172 which supports a single auxiliary supporting wheel 174 for swiveled movement about the vertical axis of the swivel pin 164.

For purposes of providing the supporting yoke 170 and wheel 174 with capabilities of absorbing shock imposed thereupon by normal travel when the vehicle 10 is towing the trailer 14, exemplary spring means are provided in the form of a pair of compression springs 176 which extend between the opposing faces of the vertical plate 154 and compression plate 160. Said springs preferably are of substantial capacity in accordance with the weight of the trailer which the springs 176 are called upon to support while augmenting the supporting capacity of the rear springs of the vehicle 10 which support the conventional rear wheel 16 of said vehicle. If desired, a guide rod 178 may be anchored at one end for example to the vertical plate 154 and extend through each spring to retain the same in operative positon and insure against the springs being dislodged from their operative positions. The opposite end of the guide rods 178 may extend through appropriate holes formed in compression plate 160, for example.

In addition to the various embodiments of combinations 9 of the type set forth above to withstand adequately the additional weight forces imposed upon the rearward portion of the conventional passenger type motor vehicle 10 by connection of the forward end of a fifth-wheel type trailer thereto, safety and comfort is provided with respect to both the vehicle 10 and the trailer 12, as well as the occupants of the vehicle 10 by the greater stability afforded the rearward portion of the vehicle 10 by the auxiliary supporting wheels in a manner to minimize and/or prevent whiplashing of the trailer relative to the vehicle while being towed thereby, even at high speeds. The particular design of the hitch mechanism 18 also contributes to such added stability.

Further in accordance with the principles of the invention, it is intended and contemplated that the hitch mechanism 18 and most if not all of the various embodiments of auxiliary supporting wheels and supplemental axles therefor are susceptible to being manufactured and sold in kit form for adaptation, relatively quickly and at small expense, to the rearward portions of conventional passenger type motor vehicles to be used to tow a fifth-wheel type trailer. Further, such auxiliary supporting wheels and supplemental axle assemblies may be disconnected from such passenger type motor vehicle by reversing the procedure of connecting the same thereto. The hitch mechanism 18 also readily may be disconnected from the trunk compartment of the vehicle by removing the bolts 34, for example, from the brackets 32 and thereby permit the entire hitch mechanism 18 to be removed from the trunk compartment. Any slots which have been formed in the floor 162 of the trunk compartment, as shown in exemplary manner in FIG. 2, may easily have simple patch plates installed thereover. Under such circumstances, the vehicle 10 will have been restored substantially completely to its original condition, such as for resale purposes or otherwise.

From the description set forth herein above, it also is evident that the height of the hitch mechanism 18 is such that it may be completely hidden by being enclosed within the trunk compartment of the vehicle 10 such as when the rear deck cover 22 is pivotally mounted in its normal position relative to the trunk compartment when the trailer 10 is disconnected from the hitch mechanism. However, when the trailer 12 is to be connected to the hitch mechanism, the rear deck cover 22 is quickly disconnected from its conventional hinge means and may be carried inconspicuously and conveniently adjacent to the under surface of the forward compartment portion 14 of the trailer 12, as illustrated in FIG. 1. Suitable brackets 180 are mounted upon said under surface of the trailer 12 to secure the rear deck cover 22 to the trailer. If it is desired to utilize the vehicle 10 in a conventional manner when the trailer 12 is disconnected from the hitch mechanism 18, particularly if it is desired to cover the hitch mechanism under such conditions, the rear deck cover 22 may be quickly disconnected from the supporting brackets 164 and hingedly connected in normal manner to the trunk compartment of the vehicle 10, whereby the hitch mechanism 18 is concealed thereby.

The entire auxiliary wheel units of the types shown in FIGS. 3–9 readily may be removed from the vehicle 10 by removing the bolts, such as bolts 61' shown in FIGS. 3–5, and the equivalent bolts 80 of the embodiment shown in FIGS. 6 and 7, and bolts 94 in the embodiment of FIGS. 8 and 9. The bolts illustrated specifically are intended to be representative of quick-detachable and attachable connecting means, yet capable of firmly securing the wheel units to the chassis of the vehicle. In the embodiments shown in FIGS. 10–13, which comprise the particular auxiliary wheel means for the invention of the instant application, attachment and detachment of the auxiliary wheel units to and from the chassis readily is accomplished simply by operatively connecting or removing the pins or bolts 126 to or from frame member 122 and sliding adjustable member 124 and the wheel units connect thereto rearwardly to separate it from member 122. When the auxiliary wheel units and supplementary fenders have been removed from the vehicle and the deck cover 22 is mounted upon the vehicle, and closed, all traces of the vehicle serving as a tractor for a trailer have disappeared.

When the trailer is disconnected from the vehicle 10, conventional jack means 182 support the forward end of the trailer in a level condition and in position to have the fifth-wheel pin thereof engage the hitch mechanism 18 when towing of the trailer by the vehicle is to be resumed.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A hitch mechanism for attaching a fifth-wheel type trailer to the trunk compartment of a passenger type motor vehicle, said hitch mechanism comprising;
   a. frame means adapted to extend upwardly from the floor of the trunk compartment of such passenger type vehicle and including means on the lower portion thereof adapted to extend through said floor for interconnection to the chassis frame of said passenger type vehicle beneath the floor of the trunk compartment thereof,
   supporting means connected to the upper portion of said frame means and having latch means to receive and secure the fifth-wheel pin of a fifth-wheel type trailer to said supporting means for rotation of said pin about a vertical axis substantially at the height of the pin of a conventional fifth-wheel trailer pin,
   c. auxiliary wheel means adapted to supplement the conventional rear wheels of said passenger type vehicle.
   d. means to interconnect said auxiliary wheel means directly to the chassis frame members of said passenger type vehicle to augment the ability of said conventional rear wheels of said vehicle to support the weight of the forward end of a fifth-wheel type trailer, said interconnecting means also including downwardly and rearwardly extending means supporting a supplemental axle upon which said auxiliary wheel means are mounted and at least one transversely extending horizontal hitch frame member having means adapted to connect it directly to the chassis frame members of said passenger type vehicle, and
   e. swivel means connecting said axle supporting means to said horizontal frame member for movement about a substantially vertical axis to permit said wheel means to track relative to the conventional wheels of said vehicle.

2. The hitch mechanism according to claim 1 further including spring means connected to said supplemental axle and operable to absorb shock imposed upon said auxiliary wheel means.

3. The hitch mechanism according to claim 1 in which said auxiliary wheel means comprise a pair of auxiliary wheels respectively mounted on the end portions of said supplemental axle, said wheels respectively being disposed at opposite sides of the axis of said swivel.

4. The hitch mechanism according to claim 3 further including spring means between said rearwardly extending means and said swivel unit and operable to urge said auxiliary wheel means downwardly, whereby said wheel means are adapted to absorb shock imposed upon same incident to operation of said hitch when connected to a moving vehicle.

5. The hitch according to claim 1 in which said auxiliary wheel means comprises a single wheel and said supporting means for said supplemental axle comprises a yoke, said yoke being connected to said swivel and movable about the axis thereof during operation of said vehicle.

6. The hitch according to claim 5 in which the legs of said yoke are similar and extend rearwardly and downwardly from said swivel.

7. The hitch mechanism according to claim 1 in which a pair of said horizontal hitch frame members are included with means adapted to connect the same transversely across the chassis frame members of a passenger type vehicle, and another frame member being connected between and transverse to said pair of members intermediately of the ends thereof to support said swivel means.

8. The hitch mechanism according to claim 7 in which said another frame member is tubular, and a second frame member complementary to said tubular member and projects from the rearward end thereof and said swivel being connected to the projecting end of said second frame member.

9. The hitch mechanism according to claim 8 further including pin means extending transversely through said another frame member and second frame member for quick removal therefrom to permit ready disconnection of said auxiliary wheel means from said vehicle when desired.

* * * * *